United States Patent Office 3,034,988

Patented May 15, 1962

3,034,988

MODIFIED CHROMIUM OXIDE FERROMAGNETIC COMPOSITIONS, THEIR PREPARATION AND USE

John N. Ingraham and Thomas J. Swoboda, Wilmington, Del., assignors to E. I. du Pont de Nemours and Company, Wilmington, Del., a corporation of Delaware No Drawing. Filed Aug. 22, 1958, Ser. No. 756,542
27 Claims. (Cl. 252—62.5)

This invention relates to ferromagnetic materials and their preparation. More particularly, it relates to new types of ferromagnetic chromium oxide, and to a method for their preparation.

Ferromagnetic materials are employed in a variety of applications. These materials are used, for example, in magnetic sound recording tapes, drums and records, memory devices, microwave circuitry, and as magnetic cores, such as coil cores in electronic equipment. In some of these applications, especially those requiring magnetic materials of low loss characteristics at high frequencies, or of relatively high coercivity, ferromagnetic oxides are normally more useful than ferromagnetic metals.

Recently several new ferromagnetic materials have been prepared which comprise chromium oxides having a tetragonal crystal structure. Although these ferromagnetic chromium oxides exhibit various combinations of magnetic properties such as coercivity and specific magnetization, compositions having novel combinations of these and still other magnetic properties, especially a wide range of Curie temperatures, are being sought. Modification of such magnetic properties as the Curie temperature, i.e., the temperature at which ferromagnetism vanishes, should yield products especially suited for certain applications. While the earlier ferromagnetic chromium oxides have had Curie temperatures of 125–130° C., higher Curie temperatures are desirable in applications where the magnetic material must operate at elevated temperatures. Lower Currie temperatures are also needed in products employed in control equipment operating near room temperature.

We have now found ferromagnetic chromium oxides having desirable combinations of magnetic properties including a wide range of Curie temperatures. Our novel products are ferromagnetic chromium oxides having a tetragonal crystal structure and containing 48.0 to 61.8% (by weight) chromium and 0.1 to 14.0% of at least one other metal having an atomic number of 22–28, i.e., titanium, vanadium, manganese, iron, cobalt and nickel as an integral part of the crystal structure. In the products of our invention the metal of atomic number 22–28 occupies spaces in the crystal lattice normally occupied by chromium. A preferred class of products contains 55.0 to 61.8% chromium and 0.1 to 7.0% of the modifying metal.

The ferromagnetic chromium oxides containing an element of atomic number 22–28 can be further modified if desired. Elements of Groups V–A and V–B of the Periodic Table are especially suitable as secondary modifiers and may be present in amounts varying from 0 to 14.0%. The range of magnetic properties attainable is greatly increased by the presence of secondary modifiers and compositions containing one or more of these modifiers in conjunction with one or more primary modifiers constitute preferred embodiments of the invention. By the use of secondary modifiers, it is possible to obtain products with coercivities over 400 oersteds as compared with values up to about 120 oersteds for products containing only the primary modifiers of this invention. Products containing primary modifiers alone or in combination with secondary modifiers have specific magnetization or sigma values ($\sigma_s$) ranging up to at least 85 electromagnetic units per gram, emu/g.) when measured in a field of 2000 oersteds, and Curie temperatures ($T_c$) in the range of about 80° C. to about 170° C. When extrapolated to infinite field, sigma values range up to 95–100 emu/g.

These modified ferromagnetic chromium oxides exhibit diverse forms. Products of high coercivity ordinarily consist essentially of small acicular particles having an average length of not more than 2 microns and having an axial ratio, i.e., the ratio of length to width, ranging from about 5:1 to about 20:1. Products exhibiting low coercivity are usually in the form of large, irregularly shaped particles of up to about 10 microns in length and having an axial ratio of 1:1 to 6:1. A third type of product which also usually exhibits relatively low coercivity is in the form of tiny irregularly shaped particles up to a few tenths of microns across. A variety of intermediate forms is also possible.

The Periodic Table referred to herein is that set forth in Deming's "General Chemistry," John Wiley & Sons, Inc., 5th ed., chapter 11.

The ferromagnetic chromium oxides of the present invention are prepared by heating chromium trioxide, $CrO_3$, with a metal of atomic number 22–28 in the form of free metal or a compound thereof and, if desired, an element (or compound thereof) of Group V of the Periodic Table at a temperature within the range of 300° to 500° C. Suitable compounds of the modifying elements for use in this process include the oxides, sulfates, carbonates, and nitrates.

The reaction can be carried out over a wide range of pressures. Pressures ranging from 1 to 3000 atmospheres, or more, are operable. Pressures of 1 to 1000 atmospheres are especially useful while pressures of 1–800 atmospheres are preferred since they result in the formation of high quality products.

As indicated above, reaction temperatures can range from 300–500° C.; however, temperatures of 325–450° C. are preferred. The lower temperatures are especially useful when operating pressures below 800 atmospheres are employed. Temperatures above 500° C. are undesirable since they cause decomposition of the ferromagnetic chromium oxides.

The reaction time is not critical in the process of this invention and may range from 10 minutes or less to 3 hours or more at the reaction temperature of 300–500° C.

Preferably, the reaction is carried out in the presence of water as reaction medium in an amount of about 0.05 to about 6.0 parts for each part of chromium trioxide. An amount of water ranging from 15–125% of the weight of the chromium trioxide is most conveniently used.

The reaction involves elimination of approximately one mole of oxygen for every two moles of chromium trioxide employed; in other words, the products correspond to a chromium dioxide ($CrO_2$) in which part of the chromium has been replaced by the modifier mentioned above. In view of the liberation of oxygen in the reaction, the processing equipment is preferably constructed of material resistant to oxygen as well as to the other reactants. Suitable materials for use at elevated pressure include platinum and the alloy known as "Hastelloy" C; at atmospheric pressure it is convenient to use glass equipment.

The ferromagnetic products of this invention have contained, in the crystal lattice at positions normally occupied by chromium atoms, the metals of atomic number 22–28, and the elements of Group V of the Periodic Table, if employed. This is indicated by chemical analysis and by the inability to recover the modifiers except in minute traces from the products by washing, magnetic separation, or by other methods. Furthermore, the pronounced effects on Curie temperature demonstrate that profound chemical modification is present. The tetragonal crystal structure of the chromium oxides of this invention is of the rutile type, i.e., the same type of crystal structure as rutile $TiO_2$.

These modified chromium oxides exhibit several magnetic characteristics which make them especially valuable for use in various specific applications. These critical properties are the intrinsic coercive force, $H_{ci}$, the specific magnetization (or sigma value, $\delta_s$), and the Curie point, $T_c$.

The definition of the intrinsic coercive force is given in Special Technical Publication No. 85 of the American Society for Testing Materials, entitled "Symposium on Magnetic Testing" (1948), pp. 191–198. The values for the intrinsic coercive force given herein are determined on a D.C. ballistic-type apparatus which is a modified form of the apparatus described by Davis and Hartenheim in the Review of Scientific Instruments, 7, 147 (1936).

The sigma value, $\delta_s$, is defined on pages 7 and 8 of Bozorth's "Ferromagnetism," D. Van Nostrand Co., New York, 1951. This sigma value is equal to the intensity of magnetization, $I_s$, divided by the density, *d*, of the material. The sigma values given herein are determined on apparatus similar to that described by T. R. Bardell on pp. 226–228 of "Magnetic Materials in the Electric Industry," Philosophical Library, New York, 1955. The sigma values in the examples below were measured in a field of 2000 oersteds.

The Curie point, or Curie temperature, $T_c$, is determined by measuring the force exerted on a specimen by an inhomogeneous magnetic field over a range of temperatures. The temperature at which the response of the specimen changes from ferromagnetic to paramagnetic as the temperature is increased is the Curie point. This temperature is conveneintly estimated from the data by graphical methods.

Because the products of this invention have such a diversity of magnetic properties, they find application in a variety of uses. Products having high coercivities in the range above 200 oersteds combined with sigma values of 60 emu/g. and above are suitable for use in the preparation of magnetic recording tapes. Those having coercivities of 300 oersteds and higher can be used in the fabrication of permanent magnets. Products having low coercivity, e.g., 30 oersteds or lower, can be used in transformer and memory cores.

In regulators of the type which depend for their action on changes in temperature, it is desirable that the response be a linear function of temperature. Products having a magnetic response linear with temperature are provided by modified chromium dioxides containing a combination of iron, manganese, cobalt or nickel and vanadium, arsenic or phosphorus.

For many applications involving magnetic materials a product with a high Curie temperature is desirable to avoid detrimental effects of elevated temperatures during operation and storage. Among the products of this invention, those containing iron are outstanding by virtue of their high Curie temperatures and thus constitute a preferred class of modified ferromagnetic chromium dioxides. On the other hand, in certain applications, for example, Curie point motors operating on solar energy, a low Curie point is desirable. Ferromagnetic chromium oxides containing vanadium exhibit reduced Curie points and the presence of arsenic or phosphorous as secondary modifiers also contributes to this modification in properties.

The invention is illustrated further by the following examples in which the proportions of ingredients are expressed in parts by weight unless otherwise noted.

EXAMPLE 1

Two and five-tenths parts of commercial grade chromium trioxide, 0.08 part of ferric oxide ($Fe_2O_3$), and 0.50 part of water are placed in a flexible walled platinum tube and the tube is then hermetically sealed. The tube is placed in a pressure vessel capable of withstanding high pressures and a pressure of helium amounting to 600 atmospheres is applied. The reaction vessel is heated to 400° C., the pressure being vented from time to time to maintain a pressure below 640 atmospheres. A temperature of 400° C.±10° C. and a pressure of 600–640 atmospheres are maintained for a period of 3 hours, after which the reaction vessel is cooled and the pressure released carefully. The platinum tube is removed and the contents are boiled in three changes of distilled water, rinsed with acetone and air-dried. The product is a black, strongly magnetic, modified chromium oxide, having the following magnetic properties: intrinsic coercive force, $H_{ci}$, 73 oersteds; specific magnetization, $\delta_s$, 74.9 emu/g.; Curie temperature, $T_c$, 155° C. Analysis shows the product to contain 2.63% Fe.

EXAMPLES 2–5

The preparation of ferromagnetic chromium oxide modified with various metals of atomic number 22–28 is illustrated by Examples 2–5, which are summarized in Table 1. The general procedure of Example 1 is followed with specific variations noted in this table. Water (16% by weight based on total reactants) is employed as medium. The reaction conditions of 400° C. and 725 atmospheres pressure are maintained for 3 hours with a maximum variation of ±5° C. and ±55 atmospheres. The properties of the resulting, modified ferromagnetic chromium oxides are also summarized in Table I.

EXAMPLES 6–13

The preparation of ferromagnetic chromium oxide modified with mixtures of metals of atomic number 22–28 is illustrated by Examples 6–13, summarized in Table II. The general procedure of Example 1 is followed using the proportions of modifying metal oxides listed in the table. The reactions are carried out in the presence of 16% (based on weight of the reactants) water. Reaction conditions of 400°±5° C. and 750±50 atmospheres for 3 hours are employed. The properties of the resulting modified chromium oxides are also listed in the table.

*Table I*

CHROMIUM TRIOXIDE HEATED WITH VARIOUS METAL OXIDES

| Example No. | Modifier, percent [a] | Magnetic Properties of Product | | |
|---|---|---|---|---|
| | | $H_{ci}$ (Oersteds) | $\sigma_s$ (emu/g.) | $T_c$ (° C.) |
| 2 [b] | $TiO_2$, 1.0 | 81 | 70.3 | ---- |
| 3 | $V_2O_5$, 2.4 | 34 | 75.8 | 116 |
| 4 | $MnO_2$, 9.6 | 56 | 75.8 | 129 |
| 5 | $Co_3O_4$, 8.8 | 43 | 65.6 | 124 |

[a] Percent modifier based on weight of $CrO_3$.
[b] Analysis shows the presence of 0.78% Ti in the final product, which on the basis of X-ray studies consists entirely of material having a rutile-type structure.

*Table II*

CHROMIUM TRIOXIDE HEATED WITH MIXTURES OF METAL OXIDES

| Example No. | Modifier, percent [a] | Magnetic Properties of Product | | |
|---|---|---|---|---|
| | | $H_{ci}$ (Oersteds) | $\sigma_s$ (emu/g.) | $T_c$ (° C.) |
| 6 | $Fe_2O_3$, 2.0; $TiO_2$, 2.0 | 105 | 77.7 | 148 |
| 7 | $Fe_2O_3$, 2.0; $V_2O_5$, 2.4 | 62 | 72.8 | 141 |
| 8 | $MnO_2$, 4.8; $V_2O_5$, 5.2 | 38 | 54.9 | 118 |
| 9 | $MnO_2$, 4.8; $Fe_2O_3$, 4.0 | 99 | 65.0 | 164 |
| 10 | $Co_3O_4$, 2.0; $TiO_2$, 2.0 | 73 | 81.3 | 126 |
| 11 | $Co_3O_4$, 4.4; $V_2O_5$, 5.2 | 26 | 51.1 | 105 |
| 12 | $Fe_2O_3$, 4.0; NiO, 4.0 | 105 | 62.0 | 158 |
| 13 | $V_2O_5$, 5.2; NiO, 4.0 | 31 | 50.3 | 99 |

[a] Percent modifier based on weight of $CrO_3$.

EXAMPLES 14–20

The preparation of modified ferromagnetic chromium oxide containing iron and an element of Group V of the Periodic Table is illustrated by Examples 14–20, summarized in Table III. The general experimental procedure is the same as in the preceding examples. Except as noted, reaction conditions of 400°±5° C. and 750±50 atmospheres are employed. The reaction medium is water used in an amount of 16% of the weight of the reactants. The properties of the resulting modified chromium oxides are shown in the table.

EXAMPLES 21–29

The preparation of modified ferromagnetic chromium oxides containing a metal of atomic number 22–28 and an element of Group V of the Periodic Table is illustrated by Examples 21–29, summarized in Table IV. The general procedure of Example 1 is followed. Except as noted, reaction conditions of 400°±9° C. and 785±95 atmospheres are employed. Water is used as the reaction medium in an amount of 16% of the weight of the reactants. The properties of the resulting modified chromium oxides are shown in the table.

*Table III*

CHROMIUM TRIOXIDE HEATED WITH IRON OXIDE AND A GROUP V COMPOUND

| Example No. | Modifiers, Percent [a] | Properties of Product | | | | | |
|---|---|---|---|---|---|---|---|
| | | Composition | | | Magnetic | | |
| | | Percent Cr | Percent Fe | Percent Other Element | $H_{ci}$ (Oersteds) | $\sigma_s$ (emu/g.) | $T_c$ (° C.) |
| 14 [b] | $Fe_2O_3$, 2.2; $CrPO_4$, 13.5 | | | | 40 | 43.2 | 100 |
| 15 | $Fe_2O_3$, 3.0; $As_2O_3$, 1.1 | | | | 90 | 69.3 | 158 |
| 16 | $Fe_2O_3$, 4.0; $Sb_2O_3$, 8.0 | 52.43 | 3.36 | Sb, 5.69 | 357 | 50.3 | 140 |
| 17 [c] | $Fe_2O_3$, 4.0; $Sb_2O_3$, 0.2 | | | | 427 | 39.1 | 147 |
| 18 | $Fe_2O_3$, 2.2; NbO, 8.9 | 53.74 | 2.05 | Nb, 3.55 | 130 | 55.7 | 146 |
| 19 | $Fe_2O_3$, 4.0; NbO, 6.0 | (d) | | | 153 | 54.7 | 155 |
| 20 | $Fe_2O_3$, 4.0; $Ta_2O_5$, 12.4 | 50.96 | 3.03 | Ta, 9.81 [d] | 113 | 59.8 | 162 |

[a] Percent modifier based on weight of $CrO_3$.
[b] $CrPO_4$ is prepared by mixing 10% aqueous solutions of $KH_2PO_4$ and $CrK(SO_4)_2.12H_2O$ in equivalent proportions at 5–8° C., filtering off the solid, hydrated $CrPO_4$ produced, drying and heating to the anhydrous salt.
[c] Conditions: 300° C., 50 atm. pressure, 3 hrs; water 16% based on wt. of $CrO_3$.
[d] X-ray diffraction shows a rutile-type tetragonal crystal structure.

*Table IV*

CHROMIUM TRIOXIDE HEATED WITH OXIDES OF PRIMARY AND SECONDARY MODIFYING ELEMENTS

| Example No. | Modifiers, Percent [a] | Properties of Product | | | | | |
|---|---|---|---|---|---|---|---|
| | | Composition | | | Magnetic | | |
| | | Percent Cr | Percent Primary Modifier | Percent Secondary Modifier | $H_{ci}$ (Oersteds) | $\sigma_s$ (emu/g.) | $T_c$ (° C.) |
| 21 | $TiO_2$, 4.4; $Sb_2O_3$, 8.0 | | Ti, 2.81 | | 253 | 55.8 | 125 |
| 22 | $V_2O_5$, 5.2; $Sb_2O_3$, 8.0 | | (c) | | 113 | 43.5 | 124 |
| 23 | $MnO_2$, 2.3; $As_2O_3$, 2.7 | | | | 43 | 69.3 | 118 |
| 24 [b] | $MnO_2$, 2.0, $Sb_2O_3$, 0.2 | | | | 224 | 69.3 | 126 |
| 25 | $MnO_2$, 4.8; $Ta_2O_5$, 12.4 | 53.72 | Mn, 3.94 | Ta, 9.73 | 51 | 76.4 | 127 |
| 26 | $Co_3O_4$, 4.4; NbO, 6.0 | 54.66 | Co, 2.47 | Nb, 4.19 | 81 | 63.5 | 127 |
| 27 | $MnO_2$, 4.8; $Sb_2O_3$, 8.0 | 51.83 | Mn, 3.41 | Sb, 3.81 [c] | 243 | 51.4 | 130 |
| 28 | $Fe_2O_3$, 2.8; $V_2O_5$, 3.2; $Ta_2O_5$, 8.0. | | | | 70 | 60.0 | 144 |
| 29 | $Fe_2O_3$, 2.8; $S_2bO_3$; 5.2 $Ta_2O_5$, 8.0. | | (c) | | 339 | 54.8 | 139 |

[a] Percent modifier based on weight of $CrO_3$.
[b] Conditions 300° C., 50 atm. pressure, 3 hours; water 16% by wt. based on $CrO_3$.
[c] X-ray diffraction shows these products to possess a rutile-type tetragonal crystal structure.

EXAMPLES 30–35

These examples, given in Table V, illustrate the preparation of modified ferromagnetic chromium oxide containing metals of atomic number 22–28 introduced as the free metals or as metal sulfates. The general procedure of Example 1 is followed using a reaction temperature of 475° C. and a pressure of 2000 atmospheres for 3 hours except as noted. The proportions of modifying metal or metal sulfate and the properties of the resulting modified chromium oxides are listed in the table.

*Table V*

CHROMIUM TRIOXIDE HEATED WITH VARIOUS METAL COMPOUNDS

| Example No. | Modifier, percent (a) | Water, percent (a) | Magnetic Properties of Product | |
|---|---|---|---|---|
| | | | $H_{ci}$ (Oersteds) | $T_c$ (° C.) |
| 30 | $FeSO_4.7H_2O$, 31 | 64 | 121 | 136 |
| 31 | $MnSO_4.H_2O$, 19 | 32 | 68 | 104 |
| 32 | $CoSO_4.7H_2O$, 31 | 32 | 69 | 121 |
| 33 | $NiSO_4.6H_2O$, 29 | 32 | 73 | 123 |
| 34 (b) | $Co_3O_4$, 2.0; Bi, 5.6 | 17 | 95 | 124 |
| 35 (b) | $Fe_2O_3$, 2.0; Bi, 5.6 | 17 | 128 | 150 |

(a) Percent based on weight of $CrO_3$.
(b) Reaction conditions: 400° C., 760±40 atmospheres pressure, 3 hours.

The examples have illustrated the process of this invention by the use of oxides and sulfates of the modifying elements as well as the elements per se. However, the process is not limited to these specific compounds. Examples of other compounds which can be used include: magnetite, ferrous oxide, cobaltous oxide, vanadium pentoxide, vanadyl sulfate, titanyl sulfate, manganese carbonate, arsenic trioxide, and manganic oxide, as well as phosphates and complex oxides such as cobaltous phosphate, titanium pyrophosphate, $FeTaO_4$, and the like.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A ferromagnetic chromium oxide having a tetragonal crystal structure and containing 48.0 to 61.8% by weight chromium and as an integral part of the crystal structure 0.1 to 14.0% of at least one other metal having an atomic number of 22–28, said chromium and said metal being combined with oxygen.

2. A ferromagnetic chromium oxide having a tetragonal crystal structure and containing 48.0 to 61.8% by weight chromium and as an integral part of the crystal structure 0.1 to 14.0% of at least one other metal having an atomic number of 22–28, said chromium and said metal being combined with oxygen, said chromium oxide being further characterized by having specific magnetizations ranging up to at least 85 electromagnetic units per gram when measured in a field of 2000 oersteds and Curie temperatures in the range of from about 80° to about 170° C.

3. A ferromagnetic chromium oxide having a tetragonal crystal structure and containing 48.0 to 61.8% by weight chromium, 0.1 to 14.0% of a primary modifier comprising at least one metal selected from the group consisting of Ti, V, Mn and metals of Group VIII, Period IV, and as a secondary modifier from 0 to 14.0% of an element of Group V–A of atomic number greater than 7 of the Periodic Table, said chromium and said metal being combined with oxygen.

4. A ferromagnetic chromium oxide having a tetragonal crystal structure and containing 48.0 to 61.8% by weight chromium, 0.1 to 14.0% of at least one metal selected from the group consisting of Ti, V, Mn and metals of Group VIII, Period IV, and 0 to 14.0% of an element of Groups V–A of atomic number greater than 7 of the Periodic Table, said chromium and said metal being combined with oxygen, said chromium oxide being further characterized by having specific magnetizations ranging up to at least 85 electromagnetic units per gram when measured in a field of 2000 oersteds and Curie temperatures in the range of from about 80° C. to about 170° C.

5. A ferromagnetic chromium oxide as set forth in claim 1 in which said chromium oxide exhibits high coercivity and consists essentially of small acicular particles having an average length of not more than 2 microns and having an axial ratio ranging from about 5:1 to about 20:1.

6. A ferromagnetic chromium oxide as set forth in claim 1 in which said chromium oxide exhibits low coercivity and consists essentially of large, irregularly-shaped particles of up to about 10 microns in length and having an axial ratio of 1:1 to 6:1.

7. A ferromagnetic chromium oxide as set forth in claim 1 in which said chromium oxide exhibits relatively low coercivity and consists essentially of tiny irregularly-shaped particles up to a few tenths of a micron across.

8. Process for preparing a ferromagnetic chromium oxide which comprises heating at a temperature of from 300 to 500° C. chromium trioxide with a metal of atomic number 22–28 other than chromium, said metal being present in an amount of 0.1 to 14.0% based on said chromium oxide equivalent to the chromium trioxide employed, said metal being combined with oxygen in the product.

9. Process for preparing a ferromagnetic chromium oxide which comprises heating at a temperature of from 300 to 500° C. chromium trioxide with a metal of atomic number 22–28 other than chromium in an amount of 0.1 to 14.0% based on said chromium oxide equivalent to the chromium trioxide employed and a source of an element of Group V of atomic number greater than 23 of the Periodic Table, said metal being combined with oxygen in the product.

10. Process for preparing a ferromagnetic chromium oxide which comprises heating at a temperature of from 300 to 500° C. chromium trioxide with a metal of atomic number 22–28 other than chromium in an amount of 0.1 to 14.0% based on said chromium oxide equivalent to the chromium trioxide employed and an element of Group V of atomic number greater than 23 of the Periodic Table, said element of Group V being present in the form of a compound, said metal being combined with oxygen in the product.

11. Process for preparing a ferromagnetic chromium oxide which comprises heating at a temperature of from 300 to 500° C. chromium trioxide with an element of atomic number 22–28 other than chromium, and an element of Group V of atomic number greater than 23 of the Periodic Table, said elements being present in the form of compounds selected from the group consisting of oxides, sulfates, phosphates, carbonates and nitrates of said individual elements, the compound containing the element of atomic number 22–28 being present in an amount of 0.1 to 14.0% calculated as the element based on said chromium oxide equivalent to chromium trioxide employed.

12. Process for preparing a ferromagnetic chromium oxide which comprises heating at a temperature of from 300 to 500° C., and under a pressure of 1 to 3000 atmospheres, chromium trioxide with a metal of atomic number 22–28 other than chromium in an amount of 0.1 to 14.0% based on chromium oxide equivalent to the chromium trioxide employed.

13. Process for preparing a ferromagnetic chromium oxide which comprises heating at a temperature of from 300 to 500° C. chromium trioxide with a metal of atomic number 22–28 other than chromium in the presence of water as a reaction medium in an amount of from about 0.05 to about 6.0 parts for each part of chromium trioxide.

14. A ferromagnetic chromium oxide having a tetragonal crystal structure and containing 48.0 to 61.8% by weight of chromium, 0.1 to 14% of a primary modifier selected from the group consisting of Ti, V, Mn, and the metals of Group VIII, Period IV, and as a secondary modifier from 0 to 14.0% of an element of Group V–B of atomic number greater than 23, said chromium and said metal being combined with oxygen.

15. A ferromagnetic chromium oxide having a tetragonal crystal structure and containing 48.0 to 61.8% by weight chromium, 0.1 to 14.0% of a primary modifier comprising at least one metal selected from the group consisting of Ti, V, Mn and metals of Group VIII, Period IV, and as a secondary modifier from 0 to 14.0% of an element of Group V–B of atomic number greater than 23 of the Periodic Table, said chromium and said metal being combined with oxygen, and said chromium oxide being further characterized by having a specific magnetization ranging up to at least 85 electromagnetic units per gram when measured in a field of 2,000 oersteds and Curie temperatures in the range of from about 80° C. to about 170° C.

16. A ferromagnetic chromium oxide having a tetragonal crystal structure and containing 48.0 to 61.8% by weight of chromium, 0.1 to 14% of a metal of Group VIII, Period IV, as a primary modifier, and as a secondary modifier from 0 to 14% of an element of Group V–A of atomic number greater than 7, said chromium and said metal being combined with oxygen.

17. A ferromagnetic chromium oxide having a tetragonal crystal structure and containing 48.0 to 61.8% by weight of chromium, 0.1 to 14% of a metal of Group VIII, Period IV, as a primary modifier, and as a secondary modifier from 0 to 14% of an element of Group V–B of atomic number greater than 23, said chromium and said metal being combined with oxygen.

18. A ferromagnetic chromium oxide having a tetragonal crystal structure and containing 48.0 to 61.8% by weight of chromium, 0.1 to 14% of Ti as a primary modifier, and as a secondary modifier from 0 to 14% of an element of Group V–A of atomic number greater than 7, said chromium and said Ti being combined with oxygen.

19. A ferromagnetic chromium oxide having a tetragonal crystal structure and containing 48.0 to 61.8% by weight of chromium, 0.1 to 14% of Ti as a primary modifier, and as a secondary modifier from 0 to 14% of an element of Group V–B of atomic number greater than 23, said chromium and said Ti being combined with oxygen.

20. A ferromagnetic chromium oxide having a tetragonal crystal structure and containing 48.0 to 61.8% by weight of chromium, 0.1 to 14% of V as a primary modifier, and as a secondary modifier from 0 to 14% of an element of Group V–A of atomic number greater than 7, said chromium and said V being combined with oxygen.

21. A ferromagnetic chromium oxide having a tetragonal crystal structure and containing 48.0 to 61.8% by weight of chromium, 0.1 to 14% of V as a primary modifier, and as a secondary modifier from 0 to 14% of an element of Group V–B of atomic number greater than 23, said chromium and said V being combined with oxygen.

22. A ferromagnetic chromium oxide having a tetragonal crystal structure and containing 48.0 to 61.8% by weight of chromium, 0.1 to 14% of Mn as a primary modifier, and as a secondary modifier from 0 to 14% of an element of Group V–A of atomic number greater than 7, said chromium and said Mn being combined with oxygen.

23. A ferromagnetic chromium oxide having a tetragonal crystal structure and containing 48.0 to 61.8% by weight of chromium, 0.1 to 14% of Mn as a primary modifier, and as a secondary modifier from 0 to 14% of an element of Group V–B of atomic number greater than 23, said chromium and said Mn being combined with oxygen.

24. A ferromagnetic chromium oxide having a tetragonal crystal structure and containing 48.0 to 61.8% by weight chromium, 0.1 to 14% of Fe as a primary modifier and as a secondary modifier from 0 to 14% of V, said chromium and said Fe being combined with oxygen.

25. A ferromagnetic chromium oxide having a tetragonal crystal structure and containing 48.0 to 61.8% by weight chromium, 0.1 to 14% of Fe as a primary modifier and as a secondary modifier from 0 to 14% of Sb, said chromium and said Fe being combined with oxygen.

26. A ferromagnetic chromium oxide having a tetragonal crystal structure and containing 48.0 to 61.8% by weight chromium, 0.1 to 14% of Fe as a primary modifier and as a secondary modifier from 0 to 14% of P, said chromium and said Fe being combined with oxygen.

27. A ferromagnetic chromium oxide having a tetragonal crystal structure and containing 48.0 to 61.8% by weight chromium and 0.1 to 14% of Fe as a primary modifier, said chromium and said Fe being combined with oxygen.

References Cited in the file of this patent

UNITED STATES PATENTS

| | | |
|---|---|---|
| 510,318 | Bertrand | Dec. 5, 1893 |
| 1,847,860 | Best | Mar. 1, 1932 |
| 2,579,267 | Leverenz et al. | Dec. 18, 1951 |
| 2,770,523 | Toole | Nov. 13, 1956 |
| 2,851,419 | Gorter et al. | Sept. 9, 1958 |
| 2,923,683 | Ingraham et al. | Feb. 2, 1960 |
| 2,923,684 | Ingraham et al. | Feb. 2, 1960 |
| 2,923,685 | Swoboda | Feb. 2, 1960 |

FOREIGN PATENTS

| | | |
|---|---|---|
| 1,107,654 | France | Aug. 10, 1955 |
| 1,154,191 | France | Oct. 28, 1957 |
| 756,383 | Germany | Oct. 20, 1952 |
| 752,659 | Great Britain | July 11, 1956 |
| 782,762 | Great Britain | Sept. 11, 1957 |

OTHER REFERENCES

Kordes et al.: Chemical Abstracts, vol. 46, col. 4411, May 25, 1952.

Gorter: Philips Research Reports, vol. 9, No. 6, pp. 438–443, December 1954.

Verwey et al.: J. Chemical Physics, vol. 15, pp. 178, 179.

Laubengayer et al.: J. Amer. Chem. Soc., vol. 74, pp. 2362, 2363, May 5, 1952.